(12) United States Patent
Appleton

(10) Patent No.: US 9,506,349 B2
(45) Date of Patent: Nov. 29, 2016

(54) WIND TURBINE COMPONENT COMPRISING RADAR-ABSORBING MATERIAL

(75) Inventor: Steve Appleton, Fleet (GB)

(73) Assignee: Vestas Wind Systems A/S, Aarhus N. (DK)

( * ) Notice: Subject to any disclaimer, the term of this patent is extended or adjusted under 35 U.S.C. 154(b) by 861 days.

(21) Appl. No.: 13/881,924

(22) PCT Filed: Oct. 26, 2011

(86) PCT No.: PCT/GB2011/052075
§ 371 (c)(1),
(2), (4) Date: Jul. 10, 2013

(87) PCT Pub. No.: WO2012/056230
PCT Pub. Date: May 3, 2012

(65) Prior Publication Data
US 2013/0280088 A1    Oct. 24, 2013

(30) Foreign Application Priority Data

Oct. 26, 2010   (GB) .................................. 1018080.0

(51) Int. Cl.
*F03D 1/06* (2006.01)
*F01D 5/14* (2006.01)
*H01Q 17/00* (2006.01)

(52) U.S. Cl.
CPC ............... *F01D 5/147* (2013.01); *F03D 1/065* (2013.01); *F03D 1/0633* (2013.01); *F03D 13/20* (2016.05); *H01Q 17/005* (2013.01); *F05B 2230/60* (2013.01); *F05B 2260/99* (2013.01); *Y02E 10/721* (2013.01); *Y02E 10/728* (2013.01); *Y02P 70/523* (2015.11); *Y10T 29/49336* (2015.01)

(58) Field of Classification Search
CPC ...................................................... F01D 5/147
See application file for complete search history.

(56) References Cited

U.S. PATENT DOCUMENTS

| 2,923,934 | A  | * | 2/1960  | Halpern ............... H01Q 17/002 264/108 |
| 3,887,920 | A  |   | 6/1975  | Wright et al. |
| 7,120,004 | B2 | * | 10/2006 | Hall ...................... B64D 45/02 361/218 |
| 7,895,746 | B2 | * | 3/2011  | Bech ................... B29C 66/1312 29/889.21 |
| 8,932,025 | B2 | * | 1/2015  | Bettermann ............ F03D 11/00 416/241 A |

(Continued)

FOREIGN PATENT DOCUMENTS

| DE | 3508888 A1 | 9/1986 |
| DE | 3824292 A1 | 1/1990 |

(Continued)

OTHER PUBLICATIONS

International Searching Authority, Search Report and Written Opinion issued in corresponding International Application No. PCT/GB2011/052075 dated Mar. 21, 2012, 11 pages.

(Continued)

*Primary Examiner* — Igor Kershteyn
*Assistant Examiner* — Eldon Brockman
(74) *Attorney, Agent, or Firm* — Wood Herron & Evans LLP

(57) ABSTRACT

A method of making a wind turbine component of composite construction with enhanced radar absorbing properties is described. The method comprises making the component and then modifying the component by applying circuit analog elements to a surface of the component.

19 Claims, 5 Drawing Sheets

(56) References Cited

U.S. PATENT DOCUMENTS

| | | | |
|---|---|---|---|
| 9,062,658 B2* | 6/2015 | Bettermann | F03D 1/0675 |
| 2004/0263420 A1 | 12/2004 | Werner et al. | |
| 2005/0041362 A1* | 2/2005 | Hall | B64D 45/02 |
| | | | 361/225 |
| 2006/0188378 A1* | 8/2006 | Bech | B29C 66/1312 |
| | | | 416/227 R |
| 2011/0129352 A1* | 6/2011 | Bettermann | F03D 11/00 |
| | | | 416/241 A |
| 2012/0025111 A1* | 2/2012 | Bryant | C08K 7/06 |
| | | | 250/515.1 |
| 2012/0034096 A1* | 2/2012 | Appleton | B29C 70/24 |
| | | | 416/241 A |
| 2012/0141285 A1* | 6/2012 | Bettermann | F03D 1/0675 |
| | | | 416/230 |

FOREIGN PATENT DOCUMENTS

| | | |
|---|---|---|
| GB | 2251338 A1 | 7/1992 |
| JP | 2003258483 A | 9/2003 |
| WO | 2009140949 A1 | 11/2009 |
| WO | 2009153555 A1 | 12/2009 |
| WO | 2010109174 A1 | 9/2010 |
| WO | 2010122350 A1 | 10/2010 |

OTHER PUBLICATIONS

Intellectual Property Office, Combined Search and Examination Report issued in corresponding GB Application Serial No. GB1018080.0 dated Feb. 24, 2011, 7 pages.

Tang et al., "Simple design of thin and wideband circuit analogue absorber", Jun. 7, 2007, pp. 689-691, vol. 43, No. 12.

* cited by examiner

WIND TURBINE COMPONENT COMPRISING RADAR-ABSORBING MATERIAL

FIELD OF THE INVENTION

The present invention relates to composite structures such as wind turbine blades that include radar-absorbing material.

BACKGROUND

It is known to incorporate radar-absorbing material (RAM) into composite structures such as wind turbine blades. This is done to reduce the radar reflectivity of the blades so that they do not interfere with radar systems such as air traffic control systems or marine radar systems.

Many radar-absorbing materials are based upon the Salisbury Screen, which comprises three layers: a lossless dielectric layer sandwiched between a reflector layer or 'ground plane' and an impedance layer or 'lossy screen'. The lossless dielectric is of a precise thickness equal to a quarter of the wavelength of the radar wave to be absorbed; the ground plane comprises a layer of highly reflective conductive material such as metal or carbon; and the lossy screen is generally a thin resistive layer.

Circuit analogue (CA) RAM technology has proven to be particularly effective for use in wind turbine blades. This is similar to the Salisbury Screen arrangement, but the impedance layer is replaced by a CA layer comprising an array of elements, such as monopoles, dipoles, loops, patches or other geometries. The elements form a pattern that repeats across the CA layer. The CA layer and the ground plane form a radar absorbing circuit in the composite structure.

It is known to embed a RAM impedance layer within a laminated composite structure such as a wind turbine blade. For example, FIG. 1a is a cross-section through an aerofoil part of a wind turbine blade 10, between a leading edge 11 and a trailing edge 12. The blade 10 is constructed from two aerodynamic shells, an upper shell 13 and a lower shell 14, which are joined together at join lines or seams that extend along the leading and trailing edges 11, 12 respectively. The shells 13, 14 are formed from a glass fibre cloth and resin composite. The shells 13, 14 are supported by a tubular structural spar 15 formed from glass fibre and carbon fibre.

FIG. 1b is an enlarged schematic view of the leading edge 11 of the blade 10, in which various layers comprising the shells 13, 14 can be seen. For ease of illustration the layers are shown separated, but in reality adjacent layers would abut. The shells 13, 14 each comprise a skin 16 of composite construction and formed from one or more layers of glass-fibre fabric within a hardened resin matrix. A CA layer 17 is deposited on an outer surface of the skin 16. A gel coat 18 covers the CA layer 17. A ground plane 19 comprising a thin layer of carbon veil, is adhered to an inner surface of the skin 16 such that it is in spaced apart relation from the CA layer 17. The CA layer 17 and the ground plane 19 act together to form a radar absorbing circuit.

When constructing the blade 10, each of the shells 13, 14 are moulded separately and then joined together. To make a shell 13 or 14, the various glass-fibre fabric layers comprising the skin 16 are laid up in a gel-coated mould. The layers may be infused with resin in the mould, or the layers may be pre-impregnated with resin (prepreg). The resin is subsequently hardened in a curing process. The CA layer 17 is pre-printed or otherwise deposited on a surface of one of the glass-fibre fabric layers prior to layup so that the CA layer 17 becomes embedded within the resulting composite structure. A prepreg material suitable for use in the above-described moulding process to provide an embedded CA layer is described in WO2010/122350. The prepreg material comprises an impedance layer deposited onto a resin-impregnated glass-fibre layer.

Whilst an embedded CA layer 17 works well in many cases, it has been found that this arrangement works less well at joins in a composite structure, for example at the join 20 between the upper and lower shells 13, 14 at the leading edge 11 of a wind turbine blade 10. This is because the repeating pattern of the CA elements is inevitably disrupted at the join, which can result in reduced RAM performance. The present invention aims to overcome this problem.

SUMMARY OF THE INVENTION

According to the present invention, there is provided a method of making a wind turbine component of composite construction with enhanced radar absorbing properties, wherein the method comprises making the component and then modifying the component by applying circuit analogue (CA) elements to a surface of the component.

The component is preferably a rotor blade for a wind turbine, but it will be appreciated that the component may be any other wind turbine component, for example the nacelle or nose cone.

If the component is made from multiple elements that are joined together, for example upper and lower blade shells, the elements may be joined prior to applying the CA elements. Hence, the step of making the component may include joining two elements together to form at least part of the component. The step of modifying the component may include applying the CA elements to a region of the surface that bridges an interface between the two elements. Providing the CA elements after the elements have been joined enables the CA elements to be applied as a repeating pattern that is not disrupted at the join between the elements.

The CA elements may be provided on the surface of the component as one of the final stages in the manufacturing process, for example after the component has been moulded and cured. Hence, the step of making the component may include arranging in a mould one or more fibrous layers within a matrix material, and subsequently curing the matrix material. It will be appreciated that the component may be made using any other suitable composites manufacturing technique, for example extrusion or automated techniques including automated fibre placement (AFP) and automated tape laying (ATL).

The fibrous layers may be any suitable fibrous layers used in the fabrication of composite articles, for example plies, mats or sheets of woven or non-woven fibres. The fibres themselves may be any suitable fibres, for example carbon or glass fibres. Typically glass fibres are used in the construction of rotor blades for modern wind turbines. The fibrous material may be a prepreg material, i.e. one in which the fibres are pre-impregnated with a semi-cured matrix material. Alternately, 'dry' fibrous material may be used, in which case resin infusion or other suitable techniques may be used to supply the matrix material to the mould. The matrix material is typically a polymeric resin, such as epoxy resin.

The component may have a gel-coated outer surface. This may be achieved by providing a gel coat on a surface of the mould. The step of modifying the component may include applying the CA elements over the gel coated outer surface of the component.

The process of making the component may include arranging a ground plane in spaced apart relation with the surface of the component to which the CA elements are to be applied. Arranging the ground plane may include adhering the ground plane to an inner surface of the component. Alternatively the ground plane may be embedded within the composite structure of the component. For example the ground plane may be laid up in the mould and integrally moulded with the component. The ground plane is made of conductive material such as metal or carbon and forms a radar absorbing circuit in combination with the CA elements. Preferably the ground plane is a layer of carbon veil. The carbon veil is preferably less than one millimeter thick.

The method may include applying a protective layer over the CA elements to protect the CA elements from environmental conditions. For example, the method may involve painting over the CA elements. The gel coat may be partially ground off before the CA elements are applied. Grinding the gel coat provides a keying surface to ensure a strong bond between the paint and the gel coat. Alternatively, a film may be provided over the CA elements. Suitable films include paint-replacement films, which are commonly used in the automotive industry. Alternately, the CA elements may be sufficiently durable to withstand environmental conditions without needing to be covered.

The CA elements are preferably applied to an outer surface of the structure. The CA elements may be applied directly to the outer surface. For example the method may comprise printing the CA elements on the surface. The CA elements may be printed using conductive ink, for example a carbon-based ink.

As an alternative to printing the CA elements on the surface of the component, the CA elements may be carried by a film, which is applied to the surface. The CA elements may be pre-printed, or otherwise deposited, on a surface of the film.

Accordingly, the invention also provides a film for applying to a surface of a component, wherein the film carries circuit analogue elements for enhancing the radar absorbing properties of the component. Preferably the CA elements are printed on a surface of the film. The film is preferably flexible. The film is preferably made from a plastics material, such as polyvinyl chloride (PVC), polyolefin, polycarbonate or any other suitable polymeric film. Preferably the film is a paint-replacement film of the type mentioned above.

Conveniently, the film may have an adhesive surface to facilitate application of the film to the surface of the component. The adhesive may be a heat-activated adhesive or a pressure-sensitive adhesive. The CA elements may be carried on the adhesive surface of the film. This is advantageous because the film then covers the CA elements on the surface of the component and provides protection against environmental conditions. Alternatively, the CA elements may be provided on the opposite surface of the film. In this configuration the film would not protect the CA elements from environmental conditions, and so the CA elements would need to be intrinsically durable or they could be covered by a protective layer such as a paint layer or another film layer.

The film may serve as an appliqué, and may be releasable from the CA elements. Hence the method of modifying the component may include removing the film from the surface of the component thus leaving the CA elements bonded to the surface.

It will be appreciated that the CA elements may be applied to the surface of the component as a retrofit, for example some time after the component has been manufactured. Accordingly, the invention provides a method of enhancing the radar absorbing properties of a wind turbine component of composite construction, wherein the method comprises applying circuit analogue elements to a surface of the component after the component has been manufactured. Hence the method may comprise making the component and then modifying the component by applying the CA elements to the surface of the component.

Expressed in apparatus terms, the present invention provides a wind turbine component of composite construction and having enhanced radar-absorbing properties, wherein circuit analogue elements are provided on an outer surface of the component.

The component may have a gel-coated outer surface and the CA elements may be provided on top of the gel coat. The component may include a protective layer covering the CA elements. The component may comprise two elements that are joined together and the CA elements may be provided in a region of the outer surface that bridges an interface between the two elements. The CA elements may form a pattern that repeats without interruption in said region of the outer surface. The component may comprise a ground plane beneath the outer surface, such that the CA elements form a radar-absorbing circuit in combination with the ground plane. Preferably the structure is a rotor blade for a wind turbine. The CA elements may be provided at a leading edge of the rotor blade in a region bridging an interface between a first and a second shell of the blade.

BRIEF DESCRIPTION OF THE DRAWINGS

Reference has already been made to FIGS. 1a and 1b of the accompanying drawings in which:

FIG. 1b is an enlarged view of the leading edge portion of the blade of FIG. 1a.

Figure 1A:
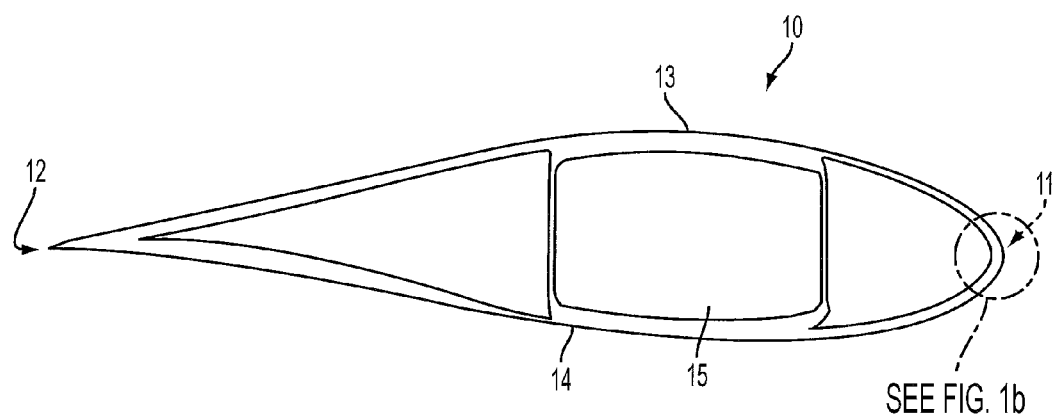
FIG. 1a is a cross-section through an aerofoil part of a wind turbine blade, between a leading edge and a trailing edge.
Figure 1B:
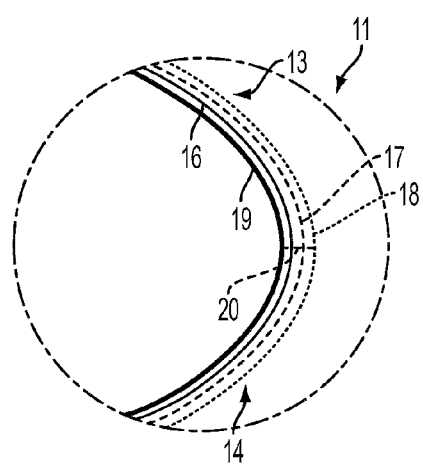
Figure 2:
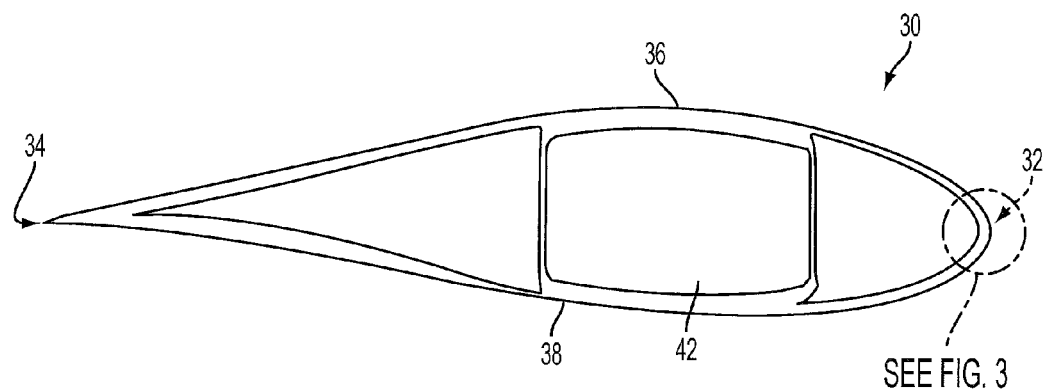
Figure 3:
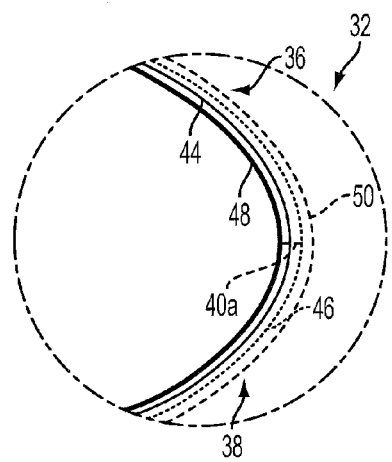
Figure 4:
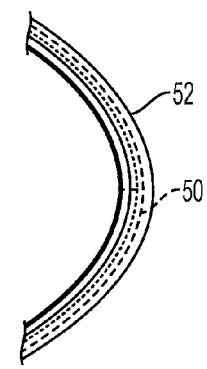
Figure 5A:
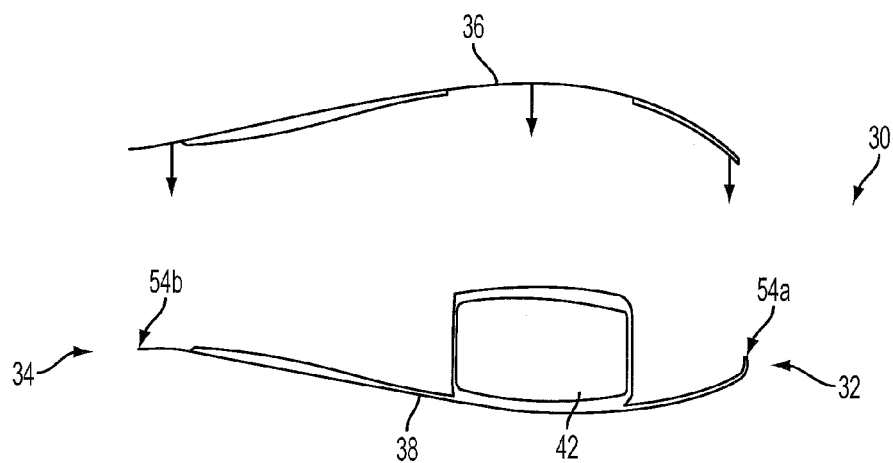
Figure 5B:
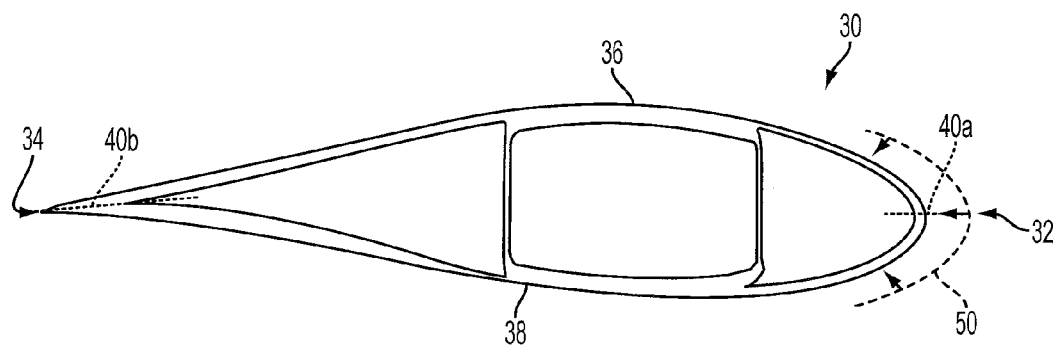
Figure 6A:
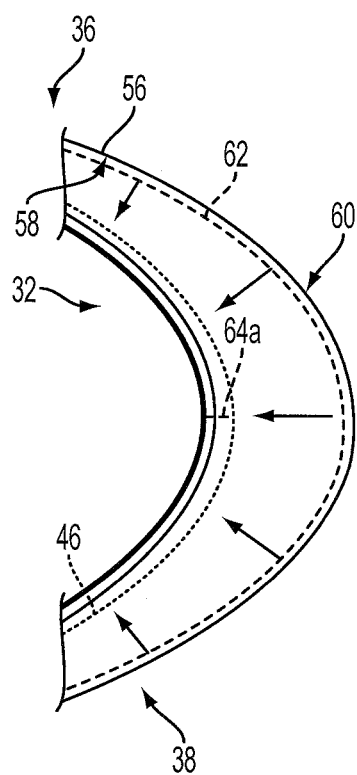
Figure 6B:
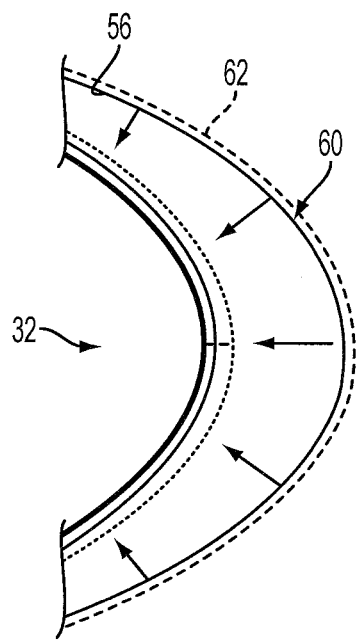

In order that the present invention may be more readily understood, reference will now be made, by way of example, to FIGS. 2 to 7, in which:

FIG. 2 is a cross-section through an aerofoil part of a wind turbine blade in accordance with the present invention, between a leading edge and a trailing edge;

FIG. 3 is an enlarged schematic view of the leading edge portion of the blade of FIG. 2, showing a circuit analogue layer provided on an outer surface of the blade;

FIG. 4 shows a paint layer provided over the circuit analogue layer;

FIG. 5a shows upper and lower shells of the blade prior to being joined together to form the blade of FIG. 2;

FIG. 5b shows a circuit analogue layer being applied to the leading edge of the blade after the shells have been joined together to form the blade;

FIG. 6a shows an embodiment of the present invention in which the circuit analogue layer is carried on an inner surface of a film, which is applied to the blade;

FIG. 6b shows an embodiment of the present invention in which the circuit analogue layer is carried on an outer surface of a film, which is applied to the blade; and FIGS. 7a to 7d show a further embodiment of the present invention in which the circuit analogue layer is carried on an appliqué film that is applied to the blade and then released from the circuit analogue elements.

DETAILED DESCRIPTION

FIG. 2 is a cross-section through an aerofoil part of a wind turbine blade 30 in accordance with the present invention.

The blade 30 extends between a leading edge 32 and a trailing edge 34, and is constructed from two aerodynamic shells, an upper shell 36 and a lower shell 38. The shells 36, 38 are joined together at join lines or seams that extend along the leading and trailing edges 32, 34 respectively. The seam 40a at the leading edge 32 can be seen in FIG. 3. The shells 36, 38 are supported by a tubular structural spar 42 formed from glass fibre and carbon fibre.

FIG. 3 is an enlarged schematic view of the leading edge 32 of the blade 30, in which the various layers comprising the shells 36, 38 can be seen. For ease of illustration the layers are shown separated, but in reality adjacent layers would abut. Each shell has a GFRP skin 44 formed from one or more layers of glass-fibre fabric within a hardened epoxy resin matrix. A gel coat 46 covers the outer surface of the skin 44. A ground plane 48 comprising a thin layer of carbon veil, is adhered to an inner surface of the skin 44.

A circuit analogue (CA) layer 50 is printed on the gel coat 46. The CA layer 50 is spaced apart from the ground plane 48 and acts together with the ground plane 48 to form a radar-absorbing circuit. The CA layer 50 comprises a circuit in the form of a geometric pattern of CA elements, which are printed on the gel coat 46 using a conductive carbon-based ink. In this example, the circuit analogue elements are sufficiently durable to withstand environmental protection. However, for increased protection, a paint layer 52 may be provided over the CA elements of the CA layer 50, as shown in FIG. 4. The paint layer 52 may cover the entire outer surface of the blade 30. This is a standard finishing step in the manufacture of wind turbine blades. The gel coat 46 is partially ground off before the CA layer 50 is printed on the gel coat 46. Grinding the gel coat 46 provides a keying surface for the paint layer 52, which ensures a strong bond to the gel coat 46.

To make the wind turbine blade 30, the upper and lower shells 36, 38 are moulded individually in respective gel-coated moulds. Each shell 36, 38 undergoes a curing process to harden the resin. Once the resin has hardened, the resulting gel-coated shells 36, 38 are self-supporting and can be removed from the moulds. Referring to FIG. 5a, the spar 42 is initially joined to the lower shell 38. An adhesive is applied along the edges 54a, 54b of the lower shell 38 that define the leading and trailing edges 32, 34 of the blade 30 respectively. The upper shell 36 is then lowered onto the lower shell 38, and adhered to the lower shell 38 and to the spar 42 to form the blade 30, as shown in FIG. 5b. As mentioned above, the resulting blade 30 has seams 40a, 40b running in a spanwise direction along the leading and trailing edges 32, 34 where the upper and lower shells 36, 38 are joined. The position of the seams 40a, 40b is represented by the dotted horizontal lines in the cross-sectional view of FIG. 5b.

In an alternative manufacturing procedure known in the art, the upper and lower shells 36, 38 may be laid-up in separate mould parts, and then the two mould parts may be brought together to form a closed mould. A matrix material may then be supplied to the closed mould and the two halves 36, 38 of the blade 30 may be cured in a single process. This results in an integral blade 30 having a continuous outer surface that does not include a noticeable seam between the upper and lower shells 36, 38. However, despite having a continuous outer surface, there would of course be an internal discontinuity or seam at the interface between the upper and lower shells 36, 38 where the various layers of the respective shells 36, 38 abut.

Referring still to FIG. 5b, once the upper and lower shells 36, 38 have been joined together, the CA elements 50 are applied to the leading edge 32. The CA elements are applied to a region of the leading edge 32 containing the seam 40a or discontinuity between the upper and lower shells 36, 38, i.e. a region bridging the interface between the upper and lower shells 36, 38. Applying the CA elements 50 to the leading edge 32 after the upper and lower shells 36, 38 have been joined together ensures that the repeating pattern of CA elements 50 is continuous, i.e. uninterrupted by the seam 40a or discontinuity between the upper and lower shells 36, 38.

In an alternative embodiment of the invention, rather than being printed directly on the outer surface of the blade 30, the CA elements are pre-printed on a PVC paint-replacement film, which is then applied to the blade 30. This embodiment will now be described with reference to FIGS. 6a and 6b.

Referring to FIG. 6a, a PVC paint-replacement film 56 includes an adhesive inner surface 58 and a non-adhesive outer surface 60. The adhesive inner surface 58 is pre-printed with a pattern of circuit analogue elements 62. The film 56 is applied to the leading edge 32 of the blade 30 with the inner surface 58 of the film 56 adhering to the gel-coat 46 of the blade 30. The adhesive film 56 facilitates application of the CA elements 62 to the leading edge 32, and in this configuration the film 56 also serves as an external barrier that covers and protects the CA elements 62 from environmental conditions. The CA elements 62 form a pattern that repeats without interruption in a region of the leading edge 32 that bridges the seam 64a between the upper and lower shells 36, 38.

FIG. 6b shows a variant of this embodiment, in which the CA elements 62 are printed on the non-adhesive outer surface 60 of the film 56. In this configuration, whilst facilitating application of the CA elements 62 to the leading edge 32, the film 56 does not protect the CA elements 62 from environmental conditions. However, a layer of paint or another film layer could be provided over the CA elements 62 if required. The CA elements 62 may alternatively be sufficiently durable not to require protection.

Figure 7A:
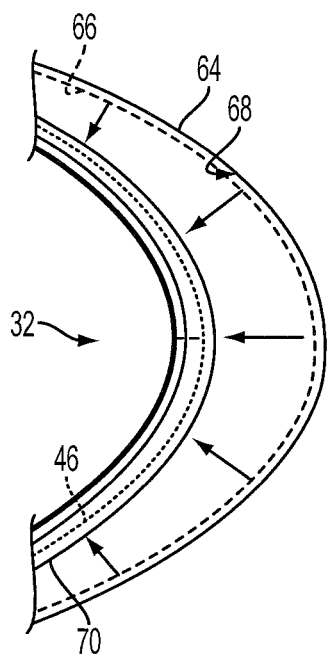
Figure 7B:
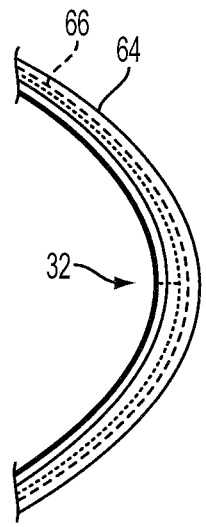
Figure 7C:
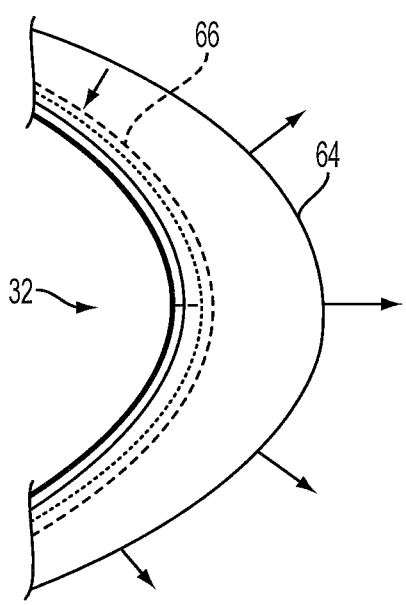
Figure 7D:
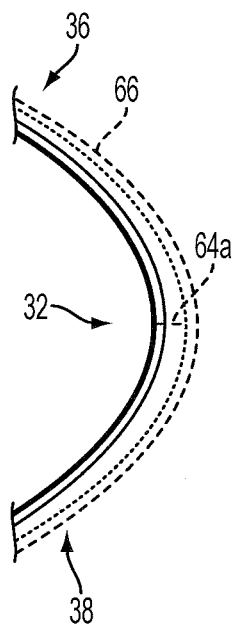

FIGS. 7a-7d show a further embodiment of the present invention, in which CA elements are carried on a film that is releasable from the CA elements, i.e. an appliqué film. Referring to FIG. 7a, an appliqué film 64 includes a plurality of CA elements 66 on an inner surface 68. An adhesive layer 70 is applied on top of the gel coat 46 of the leading edge 32 of the blade 30. The appliqué film 64 is then applied to the leading edge 32 of the blade 30, with the inner surface 68 of the film 64 facing the leading edge 32. In this way, the CA elements 66 adhere to the leading edge 32 as shown in FIG. 7b. Next, and referring to FIG. 7c, the appliqué film 64 is peeled away from the CA elements 66 to leave the CA elements 66 adhered to the leading edge 32 of the blade 30 as shown in FIG. 7d. The CA elements 66 form a pattern that repeats without interruption in a region of the leading edge 32 that bridges the seam 64a between the upper and lower shells 36, 38. In a variant of this embodiment, the CA elements 66 may be adhesive, which would dispense with the need for an adhesive layer 70 being applied to the gel coat 46.

It will be appreciated that many modifications may be made to the specific examples described above without departing from the scope of the present invention as defined by the accompanying claims.

The invention claimed is:

1. A method of making a wind turbine component of composite construction with enhanced radar absorbing properties, the method comprising:

making the component and then modifying the component by applying circuit analogue elements as a repeating pattern to a surface of the component, wherein making the component comprises joining two component elements together to form at least part of the component and modifying the component includes applying the circuit analogue elements to a region of the surface that bridges an interface between the two component elements.

2. The method of claim 1, wherein making the component comprises arranging in a mould one or more fibrous layers within a matrix material.

3. The method of claim 2, wherein making the component comprises curing the matrix material.

4. The method of claim 1, wherein making the component comprises providing a gel coat on a surface of the mould such that the resulting moulded component has a gel-coated outer surface, and modifying the component comprises applying the circuit analogue elements over the gel coated outer surface of the component.

5. The method of claim 1, wherein making the component comprises arranging a ground plane in spaced apart relation with the surface of the component to which the circuit analogue elements are to be applied.

6. The method of claim 1, further comprising printing the circuit analogue elements on the surface of the component.

7. The method of claim 1, further comprising applying a protective layer over the circuit analogue elements.

8. The method of claim 7, further comprising painting over the circuit analogue elements.

9. The method of claim 1, wherein modifying the component comprises applying a film to the surface, with the circuit analogue elements being carried on a surface of the film.

10. The method of claim 9, further comprising removing the film from the surface leaving the circuit analogue elements bonded to the surface.

11. The method of claim 1, wherein the circuit analogue elements are applied to an outer surface of the component.

12. The method of claim 11, further comprising applying the circuit analogue elements directly to the outer surface.

13. A rotor blade for a wind turbine, the rotor blade being constructed in accordance with the method of claim 1.

14. A wind turbine component of composite construction and having enhanced radar-absorbing properties, the component comprising:

circuit analogue elements that are provided on an outer surface of the component; and two component elements that are joined together, wherein the circuit analogue elements are provided in a region of the outer surface that bridges an interface between the two component elements and the circuit analogue elements form a pattern that repeats without interruption in the region of the outer surface.

15. The wind turbine component of claim 14, wherein the outer surface is a gel-coated outer surface and the circuit analogue elements are provided on the gel coat.

16. The wind turbine component of claim 14, further comprising a protective layer covering the circuit analogue elements.

17. The wind turbine component of claim 14, further comprising a ground plane beneath the outer surface, wherein the circuit analogue elements form a radar-absorbing circuit in combination with the ground plane.

18. The wind turbine component of claim 14, wherein the component is a rotor blade for a wind turbine.

19. The rotor blade of claim 18, wherein the circuit analogue elements are provided at a leading edge of the rotor blade in a region bridging an interface between a first and a second shell of the blade.

* * * * *